(12) United States Patent
Axtell et al.

(10) Patent No.: US 8,960,860 B2
(45) Date of Patent: Feb. 24, 2015

(54) PRINTHEAD DIE

(75) Inventors: James P. Axtell, Portland, OR (US);
Joseph M. Torgerson, Phlomath, OR (US); Trudy Benjamin, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/113,225

(22) PCT Filed: May 31, 2011

(86) PCT No.: PCT/US2011/038540
§ 371 (c)(1),
(2), (4) Date: Oct. 22, 2013

(87) PCT Pub. No.: WO2012/166112
PCT Pub. Date: Dec. 6, 2012

(65) Prior Publication Data
US 2014/0043396 A1    Feb. 13, 2014

(51) Int. Cl.
*B41J 2/17* (2006.01)
*B41J 2/14* (2006.01)
*B41J 2/16* (2006.01)
*B41J 2/155* (2006.01)

(52) U.S. Cl.
CPC *B41J 2/14* (2013.01); *B41J 2/1621* (2013.01); *B41J 2/14145* (2013.01); *B41J 2/155* (2013.01); *B41J 2002/14419* (2013.01); *B41J 2202/11* (2013.01)
USPC .............................................. 347/49; 347/58

(58) Field of Classification Search
None
See application file for complete search history.

(56) References Cited

U.S. PATENT DOCUMENTS

| | | |
|---|---|---|
| 2003/0052944 A1 | 3/2003 | Scheffelin et al. |
| 2003/0076381 A1 | 4/2003 | Anderson et al. |
| 2003/0179262 A1 | 9/2003 | Nishikori et al. |
| 2003/0202045 A1 | 10/2003 | Torgerson et al. |
| 2004/0125173 A1 | 7/2004 | Parish et al. |
| 2004/0218017 A1 | 11/2004 | Kawamura et al. |

FOREIGN PATENT DOCUMENTS

| | | |
|---|---|---|
| EP | 0705693 | 4/1996 |
| KR | 201999010872 | 3/1999 |

OTHER PUBLICATIONS

Supplementary European Search Report for Application No. 11866663.5. Report issued Feb. 12, 2014.

*Primary Examiner* — Lamson Nguyen
(74) *Attorney, Agent, or Firm* — Hewlett-Packard Patent Department; Walt Karnstein

(57) ABSTRACT

A printhead die is provided that includes a substrate and a slot extending through the substrate, the slot including a first slot segment and a discrete second slot segment, the second slot segment being offset from the first slot segment along a major axis and along an orthogonal minor axis.

13 Claims, 4 Drawing Sheets

PRINTHEAD DIE

BACKGROUND

Inkjet printheads are widely used in printing mechanisms today. Those mechanisms, in turn, go into many products such desktop printers, portable printers, plotters, copiers, camera printers, transaction printers, video printers, point-of-sale terminals, facsimile machines, and all-in-one devices (e.g. a combination of at least two of a printer, scanner, copier, and fax), to name a few.

Printheads typically have a number of liquid ejection elements, often referred to as "nozzles", that are arranged in a linear orientation having a particular length along the major axis of the linear array. This length may be referred to as the "height" of the printhead, although the printhead can be orientated in any direction. The length along the minor axis of the linear array, a direction that is orthogonal to the height of the printhead, may be referred to as the "width". In general, the wider the printhead for a given length, the larger the area of the printhead, and the higher the cost of the printhead.

DETAILED DESCRIPTION

Figure 1:
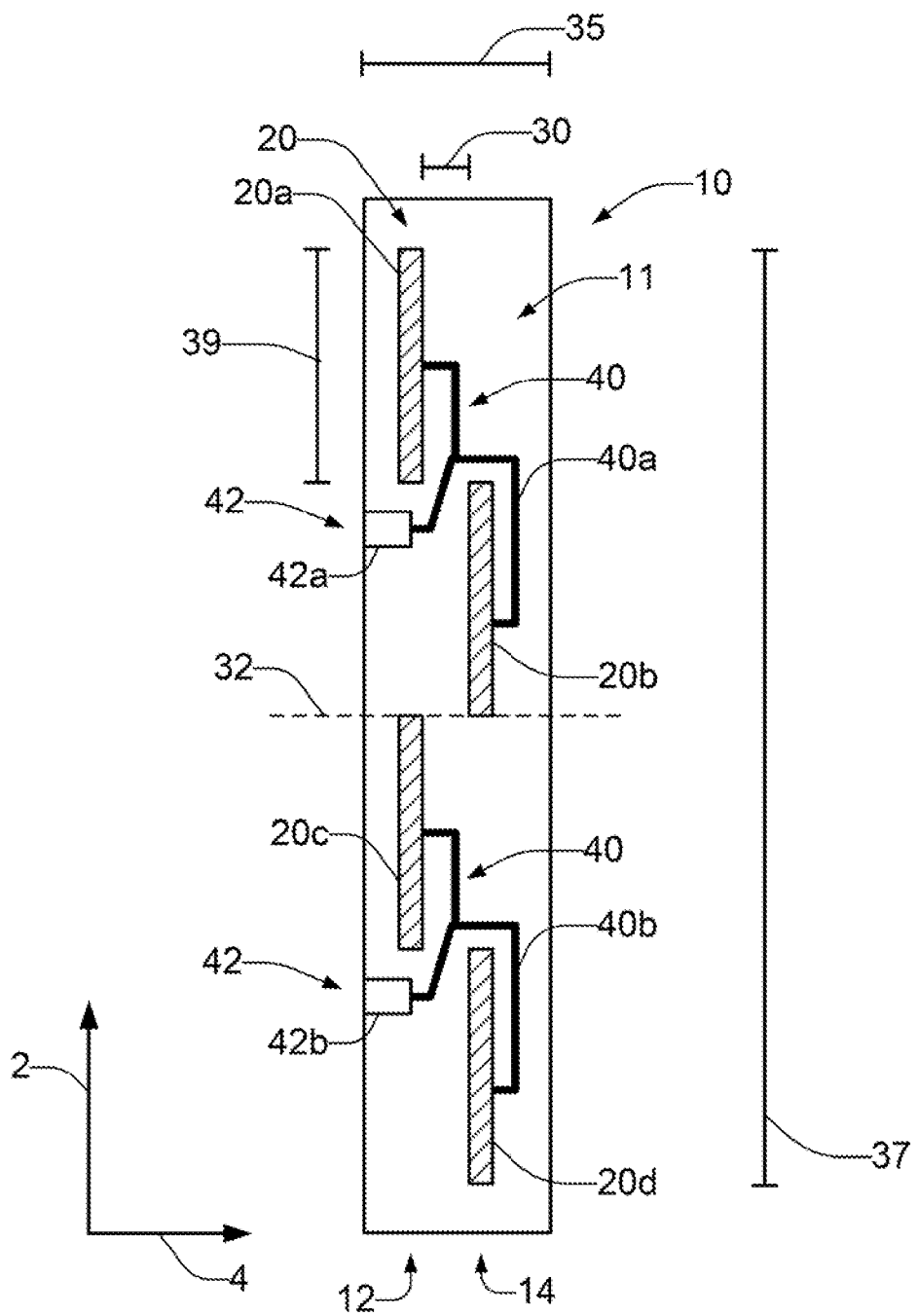
FIG. 1 is a schematic representation of a printhead die for emitting drops of a particular liquid, in accordance with an embodiment of the present disclosure.

In an inkjet printer, drops are deposited on a print medium, as the printer's printhead, the print medium, or both, are moved relative to each other. In order to enhance printer throughput, the printer may be configured such that the printhead has a height that is at least as large as a corresponding dimension of the print medium. In operation, the print medium thus may pass beneath the printhead, and drops may be deposited on the entire printable area in a single pass. This may effectively eliminate the delay otherwise associated with reciprocating the printhead across the print medium to cover the entire printable area.

Inkjet printheads typically are fabricated on a substrate, such as a silicon die, using integrated circuit and/or micromachining fabrication techniques. Nozzles may be disposed on either side of a feed slot that is formed completely through the die. The feed slot feeds liquid to the nozzles for ejection. In one type of inkjet technology, referred to as "thermal inkjet", a heating element, such as a resistor, rapidly heats a small volume of liquid, forming a bubble which causes at least one drop of the liquid to be ejected. The electrical energy needed to operate the nozzles is typically connected to the die at a surface edge.

As defined herein and in the appended claims, a "liquid" shall be broadly understood to mean a fluid not composed primarily of a gas or gases. In addition, terms of orientation and relative position (such as "top", "bottom", "side", "height", "width", "length", and the like) are not intended to require a particular orientation of any element or assembly, and are used for convenience of illustration and description.

In the forgoing arrangement, since the feed slot extends completely through the die, the electrical traces carrying energy to the firing resistors must be routed around the slot. The longer the length of a slot, the longer the electrical traces used to get the energy from one side of the slot to the other. Comparatively long electrical traces on the die result in an electrical voltage drop (due to the parasitic resistance of the traces) that increases along the length of a trace, particularly for those traces that carry significant amounts of electrical current.

In printheads having a height of more than about one inch, these voltage drops can become large enough to prevent the nozzles nearest to the electrical connection to the die, and/or the nozzles furthest from the electrical connection to the die, from operating in their allowable voltage range. If this occurs, the size of the drops ejected from different nozzles may vary, some nozzles may be unable to emit drops, and some nozzles may be damaged. All of these effects result in the quality of the printed output being degraded.

Referring now to the drawings, example printhead die are illustrated wherein electrical traces provide proper electrical power to the various nozzles of the die in order to produce print output of the desired quality. As indicated, the die may provide plural feed slots to feed the same liquid to different nozzle subsets within a broader nozzle array. Feed slots, and nozzle subsets may extend along a major axis of the die. The shaping and layout of the various components on the printhead die minimize the width (along a minor axis) of the die while providing proper power distribution to all nozzles, thus reducing the cost of the printhead die.

An example printhead die 10 is shown in FIG. 1, the printhead die having a slot arrangement in which a full-length slot 20 is formed through a substrate 11, the full-length slot being segmented into a plurality of smaller discrete slot segments 20a-20d for feeding a same liquid (represented generally by cross-hatch in FIG. 1) through the die. As shown, the slot segments may form plural columns, each column including at least one slot segment. In this regard, slot segments 20a-20d define two substantially parallel columns 12, 14, each column including a pair of aligned slot segments, parallel to the slot segments in the other column. Although each column is shown with two slot segments in FIG. 1, more or fewer slot segments may be employed.

As indicated, column 12 is offset from column 14 in the minor axis direction 4 by a slot-to-slot spacing 30. In some examples, the slot-to-slot spacing 30 may be approximately 1000 microns. It will be understood that slot-to-slot spacing 30 may be determined, in part, by the desire to run electrical traces between the slot segments. It also will be understood that the slot-to-slot spacing 30 affects the width 35 of die 10. Width 35, in turn, affects the cost of the die.

The slot segments may be staggered such that adjacent slot segments are in different rows. Adjacent slot segments (in different columns), such as slot segments 20a, 20b, are also offset from each other along the major axis direction 2. Typically, adjacent slot segments (again, in different columns) are arranged such that adjacent ends of the slot segments are positioned along the same minor axis. For example, the adjacent ends of slot segments 20b, 20c are along the same minor axis 32. Similarly, the adjacent ends of slot segments 20a, 20b are along the same minor axis, as are the adjacent ends of slot segments 20c, 20d, and so on. This positioning facilitates treating the nozzles associated with the slot segments of both columns 12, 14 as a virtual linear array of nozzles of height 37 during printing operations, where the nozzles are equally spaced along the major axis 2. The slot segments thus may act as a single full-length slot.

In some examples, the adjacent ends of adjacent slot segments (in different columns) may overlap the minor axis 32 by a few nozzles in order to allow for compensation of effects such as misdirection of drops ejected from end nozzles or to provide sufficient liquid flow to the end nozzles. In such examples, the overlapping nozzles that achieve the desired printing performance may be chosen for use during, printing operations. Where the die is a page wide array die, the height 37 may be one to four inches, or more.

Electrical power, as well as data and/or control signals, may be connected to printhead die 10 via contact pads 42. Each contact pad 42 is associated with an individual power connection, data signal, or control signal. Typically, at least one contact pad 42 is disposed on die 10 between each two slot segments in a particular column. For example, contact pad 42a is disposed in column 12 between slot segments 20a, 20c.

From contact pads 42, electrical traces 40 are run across die 10 in minor axis direction 4. Since the slot segments pass completely through the die, the electrical traces are routed around the slot segments. The slot-to-slot spacing 30 thus selected to be sufficient to allow, for example, electrical trace 40a to pass between the lower end of slot segment 20a and the upper end of slot segment 20b. Electrical trace 40a thus can be connected to electronics disposed on the side of slot segments 20a, 20b that is opposite contact pad 42a. While not illustrated for reasons of clarity, it is understood that electrical traces from pad 42a also may directly connect to electronics on the side of slot segments 20a, 20b that is nearest contact pad 42a.

Based on the foregoing, the total length of electrical trace 40a may be considerably shorter than it would be if, for example, slot segments 20a-20d were all combined into a single slot of height 37. In that case, the trace 40a would be far longer, as it would be routed around the top or bottom end of the die to get to the electronics on the other side of the slot from the pad. In page wide arrays, and particularly for power traces that carry a significant amount of current, such as up to one ampere, this excessive distance would result in unacceptable voltage drops due to the parasitic resistance of the trace.

However, in the present example, the lengths of electrical traces 40a, 40b are short enough to ensure that the voltages applied to all nozzles, regardless of location, are within tolerance. This, in turn, helps ensure that the size of the drops ejected from different nozzles is consistent, and that all nozzles are able to emit drops, which in turn helps ensure that the printed output is of high quality.

Figure 2:
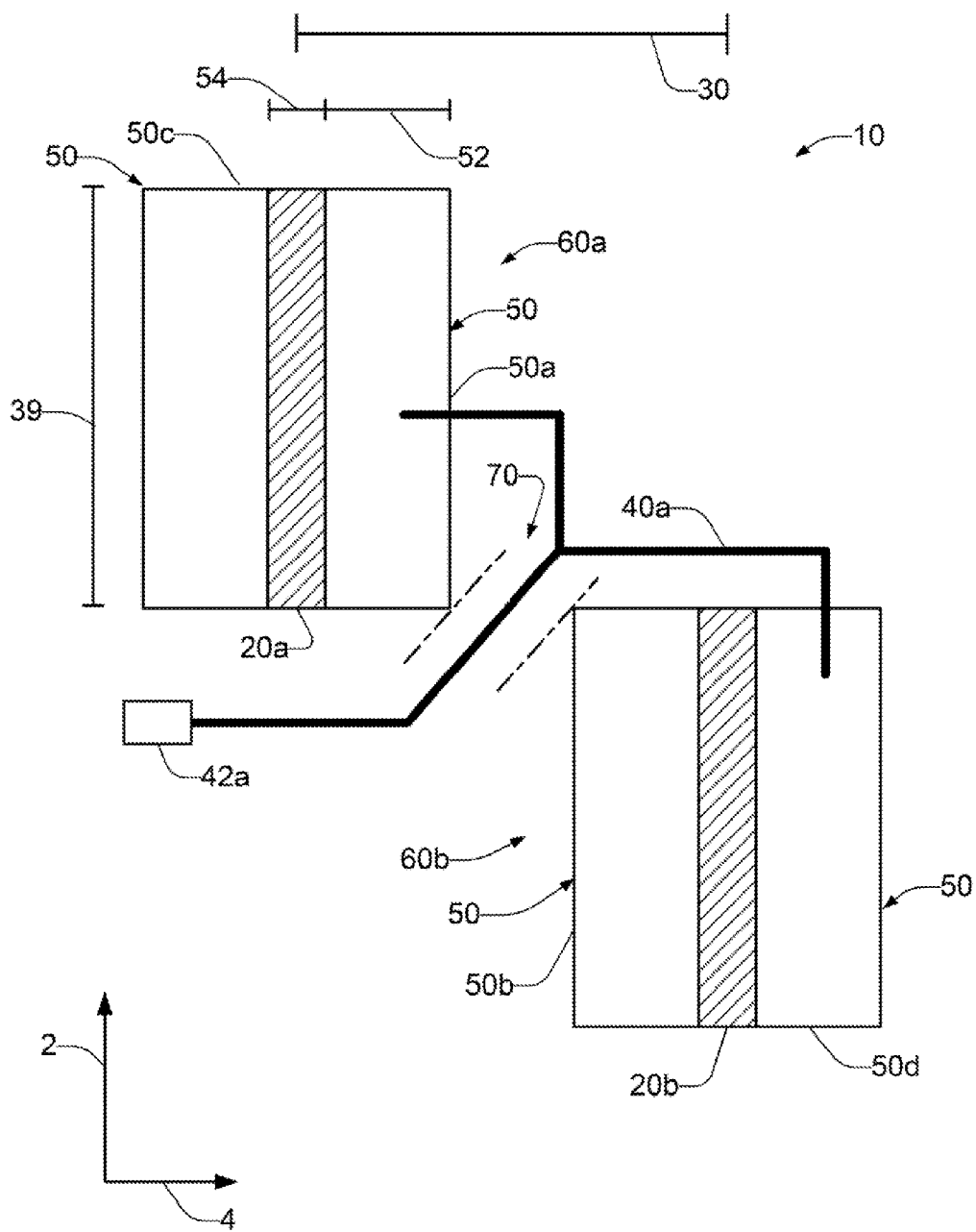
FIG. 2 is an enlarged schematic representation of a portion of the printhead die of FIG. 1 showing an end of adjacent nozzle packages in two columns, in accordance with an embodiment of the present disclosure.

Considering now in greater detail, and with reference to FIG. 2, two adjacent slot clusters 60a, 60b of printhead die 10 are shown, each cluster being positioned in a different column. As indicated, a nozzle package 50 is disposed adjacent to, or abutting, each long side of a slot. Each nozzle package 50 may be substantially rectangular, and has a height substantially the same as the slot segment height.

As used herein, a "slot cluster" shall be broadly understood to mean the arrangement of a slot segment and at least one nozzle package disposed abutting or adjacent to a long side of the slot segment. A "nozzle package" shall be broadly understood to include an array of spaced nozzles abutting or adjacent to a long side of a slot segment, such that the liquid fed through the slot segment can flow into each nozzle of the nozzle package for subsequent ejection. Each nozzle package also shall be understood to include electronics that receive power, data, and/or control signals that cause drops of the liquid to be controllably ejected from the individual nozzles. The form factor of the electronics is shown as a simple rectangle, but other arrangements are contemplated. The power data and/or control signals are received by the electronics via traces which may be connected to signal source locations such as, for example, pads 42a. The power, data and/or control signals may be routed through a diagonal pathway 70 between adjacent clusters 60a, 60b.

The electronics of each nozzle package may include, for example, a drive switch array disposed adjacent, or abutting, the linear nozzle array. Each nozzle in the linear array is associated with a corresponding drive switch in the drive switch array. Typically, a power trace (also referred to as a "fire line") is connected to one side of the firing resistor of the nozzle, and the corresponding drive switch is connected to the other side of the firing resistor. The drive switch is also connected to a reference voltage (typically ground) trace. The drive switch controls the flow of current through the firing resistor. When the drive switch is turned on, current sufficient to heat the liquid and eject the drop from the nozzle flows from the power trace, through the firing resistor, to ground. In some examples, the drive switch is a field-effect transistor (FET) switch in which the firing resistor and ground are connected to the drain-source path of the FET, and the drive switch array is an array of such FETs.

The electronics also may include a control logic array disposed adjacent, or abutting, the drive switch array. The control logic array receives data and control signals and determines whether and when drops of the liquid are ejected from a particular nozzle. An output from the control logic array is connected to the control input of each drive switch, such as the gate of a FET switch. In some examples, the control logic array includes about five to ten logic-type control transistors for each FET drive switch. However, these control transistors each typically occupy a smaller area than the FET drive switch.

In some examples, the width 54 of each slot segment in the minor axis direction 4 is about 150 microns. The height 39 of each slot segment in the major axis direction 2 may be about 15,000 to 30,000 microns. Thus the slot may have an aspect ratio of about 100 to 1, or greater. Consequently, for a page wide printhead die wherein each slot segment has a height of approximately ½-inch, there will be eight slot segments in each column (a total of 16 slot segments) in order to for a achieve an 8-inch swath height. It will be appreciated that the drawings of FIGS. 1 through 3, accordingly, are, for purposes of clarity, not drawn to scale and do not show all of the slot segments.

In some examples, the width 52 of a nozzle package 50, including the nozzle array and the electronics, may be about 400 microns. Where the slot segment width 54 is about 150 microns, as described above, and where there is a nozzle package on each side of the slot segment, the corresponding slot cluster 60a is about 950 microns wide. The slot-to-slot spacing 30 is based not just on the width 52 of the nozzle packages 50a, 50b, however, but also on the width, in minor axis direction 4, of the pathway 70 through which electrical trace 40a is routed to at least nozzle package 50d. In addition, power, data and/or control signals may be provided to the electronics of nozzle package 50a via a trace that is coupled to electrical trace 40a (as shown), or connected directly from pad 42a. Such electrical trace could connect to the electronics of nozzle package 50a without being run through pathway 70.

The length and the width of trace 40a, in turn, depend not just on the width of the slot clusters, but also on the slot-to-slot spacing 30 between slot segments 20a and 20b in minor axis direction 4. A longer trace 40a occurs with a larger spacing 30. With regard to the width of trace 40*a*, although one trace 40*a* and pad 42*a* are illustrated for clarity, it can be appreciated that a number of different traces for power, data, and/or control signals may run through pathway 70. The dimensions of pathway 70 are typically chosen to accommodate the number and the width of the traces that are routed through the pathway 70. Or, stated conversely, the dimensions of the pathway 70 may limit the number and/or the width of the traces that can be routed through the pathway 70.

It will be appreciated that the width of power traces is typically considerably wider than that of data or signal traces, due to the larger amount of current carried by the power traces. The more and/or wider the traces that run through the pathway 70 are, the wider the pathway itself. Because the adjacent ends of slot segments 20*a*, 20*b* are constrained to remain along the same minor axis 32 in order to maintain the equidistant spacing of nozzles in the major axis direction 2 across both slot segment 20*a* and slot segment 20*b*, widening the pathway 70 is accomplished by increasing the slot-to-slot spacing 30.

Figure 3:
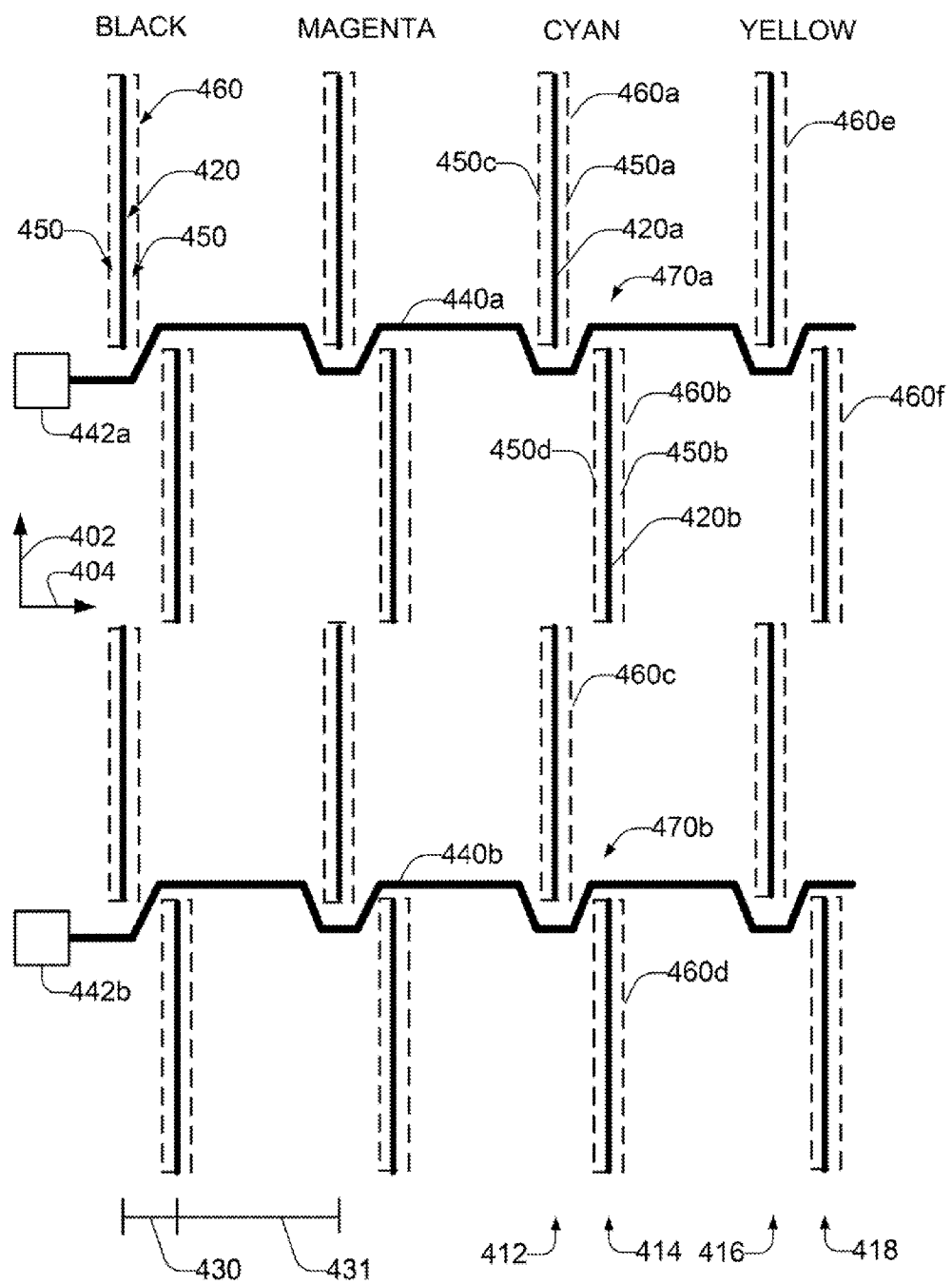
FIG. 3 is a schematic representation of a printhead die for emitting drops of a plurality of different liquids, in accordance with another embodiment of the present disclosure.

Considering now a printhead die for emitting drops of a plurality of different liquids in accordance with another example of the present disclosure, and with reference to FIG. 3, the die may be a rectangular page wide array printhead die 410. The die 410 takes the form of a substrate having an arrangement of generally rectangular printhead slot clusters 460 formed thereon. Each printhead slot cluster 460 has a liquid feed slot 420 that substantially bisects the slot cluster 460 in a bisecting direction 402. Each slot cluster 460 also has a nozzle package 450 adjacent, or abutting, each side of the liquid feed slot segment 420. One example of a nozzle package 450 may include a nozzle array and electronics. Another example of a nozzle package 450 may include a nozzle array, a drive switch array, and a control logic array as described with reference to FIG. 2 above.

As shown, nozzle packages for a given liquid—such as, for example, a liquid of a particular color—are staggered in two alternating columns 412, 414 in the bisecting direction 402. The die 410 has a diagonal pathway 470*a* between a first slot cluster 460*a* for the given liquid in the first column 412 and an adjacent second slot cluster 460*b* for the given liquid in the second column 414. A electrical trace 440*a* can be routed from a first location in the first column (i.e. a location in the first column between the first slot cluster 460*a* and a third slot cluster 460*c*), through the diagonal pathway 470*a*, and connect to the nozzle package 450*b* of the second slot cluster 460*b* disposed on the opposite side of the liquid feed slot 420*b* from the first location. The electrical trace 440*a* may also connect to one or more of the nozzle package 450*a*, 450*c* and 450*d*.

In some examples, two alternating columns 416, 418 of slot clusters 460*e*, 460*f* for a second liquid (e.g. yellow ink), different from the given liquid for slot clusters 460*a*, 460*b* (e.g. cyan ink), are spaced apart, in a direction 404 orthogonal to the bisecting direction 402, from the two alternating columns 412, 414 for the given liquid. The slot-to-slot spacing 431 between slot clusters 460 for two different liquids in adjacent columns (e.g., columns 414, 416) may be considerably greater than the slot-to-slot spacing 430 between slot clusters 460 for the same liquid in adjacent columns (e.g., columns 412, 414). The spacing 431 is typically related to the size of the physical barriers, such as vertical ribs, between columns 414, 416 that are attached to the back side of the die 410 to keep the two different liquids separated from each other.

In some examples, the slot clusters 460 are arranged on the die 410 in rows and columns. Each pair of adjacent columns is associated with a different liquid. For example, columns 412 and 414 collectively include a full-length slot for delivery of cyan ink, while columns 416 and 418 collectively include a full-length slot for delivery of yellow ink.

Each slot cluster 460 is assigned to a particular row. In some examples, an electrical trace 440*a* is routed across the die 410 in the row direction 404 between two rows of slot clusters 460. For example, electrical trace 440*a* follows a serpentine path across the die that passes in a serpentine manner through a diagonal passageway 470*a* between a slot cluster 460*a*, 460*e* in one row and a slot cluster 460*b*, 460*f* in the other row. Typically, electrical trace 440 is routed between every other adjacent pair of rows. For example, power trace 440*b* passes in a serpentine manner through a diagonal passageway 470*b* between a slot cluster 460*c* in one row and a slot cluster 460*d* in the other row. Contact pads 442*a*, 442*b* may be disposed at or near a vertical edge of the die 410. For example, pad 442*a* is connected to electrical trace 440*a*, while pad 442*b* is connected to electrical trace 440*b*.

Figure 4:
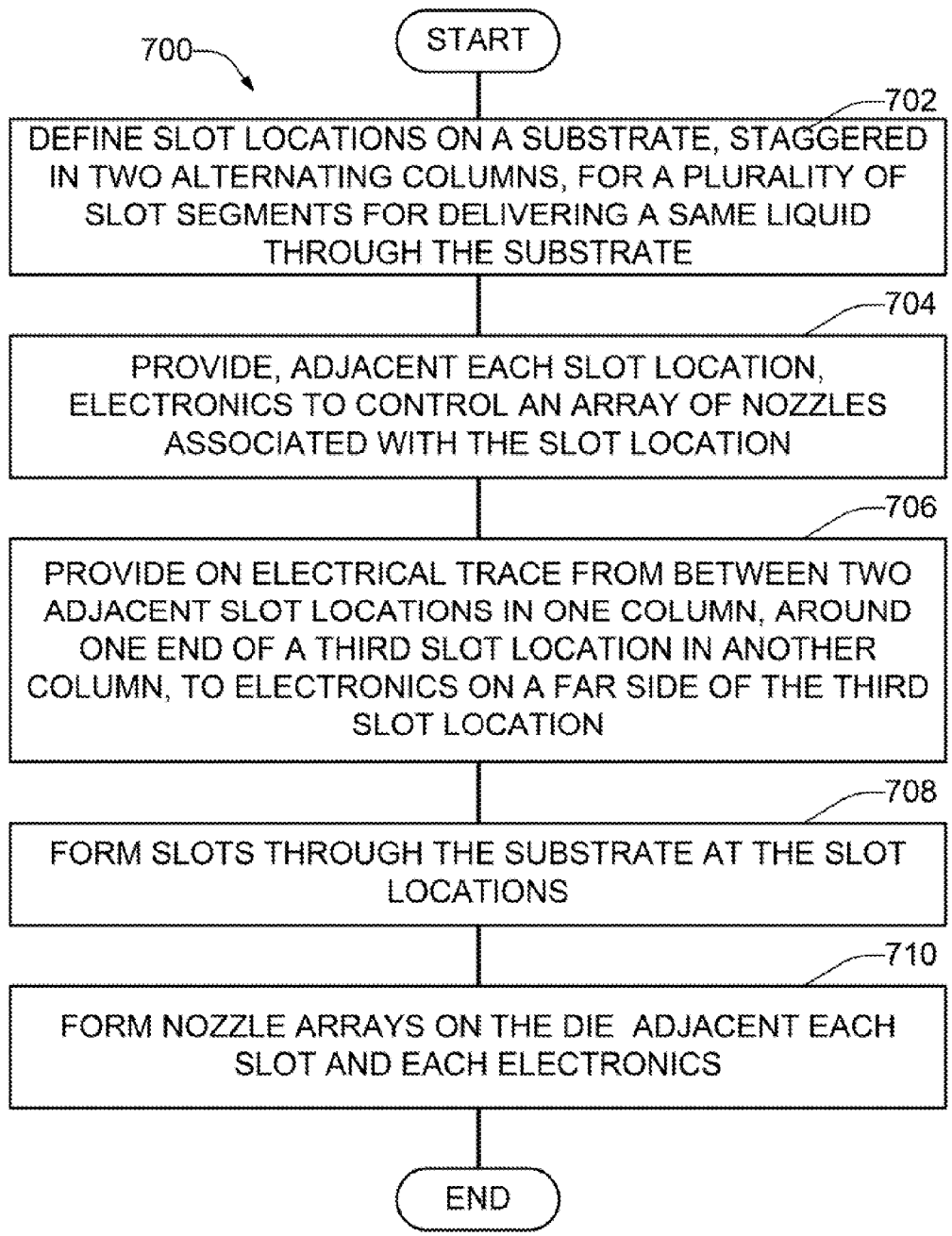
FIG. 4 is a flowchart according to an embodiment of the present disclosure of a method of making a printhead die.

Considering now a method 700 for making a page wide array silicon printhead die in accordance with an example of the present disclosure, and with reference to FIG. 4, at 702, locations for slot segments for a same liquid, staggered in two alternating columns, are defined on the substrate.

At 704, nozzle electronics are provided on one or both sides of each slot location. The electronics can be fabricated on the die by integrated circuit processing techniques such as a standard NMOS or CMOS silicon fabrication process. The electronics are configured to control ejection of drops of the same liquid from a linear array of nozzles.

At 706, traces, including one or more power traces, are provided from a source point, such as a pad, between two adjacent slot locations in one column, around one end of a third slot location in the other column, to electronics on a far side of the third slot location. The traces can be fabricated on the die using integrated circuit processing techniques the same or similar to those for the electronics.

At 708, slots are formed through the substrate at each of the slot locations. The slots can be formed through the substrate by techniques such as laser drilling. The slot is typically formed after the electronics and the traces have been fabricated.

At 710, nozzle arrays are formed on the die between each slot and each electronics. In general, there are two parts to a nozzle array: the firing resistors, and the orifice layer that defines the chambers in which the firing resistors are disposed. The firing resistors are fabricated using integrated circuit processing techniques, such as NMOS or CMOS techniques. In some examples the orifice layer is a metal orifice layer that is attached to the die. In other examples the orifice layer is an SU8 MEMS-type orifice layer formed using semiconductor processing techniques such as patterning and etching. In some examples, the firing resistors may be formed before slot formation, while the orifice layer is formed after slot formation.

In some examples, a number of die may be fabricated on a single silicon wafer, from which an individual die is cut or separated.

Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A printhead die, comprising:
   a substrate; and
   a slot extending through the substrate, the slot including a first slot segment and a discrete second slot segment, the second slot segment being offset from the first slot segment along a major axis and along an orthogonal minor axis;
   wherein the offset between the first slot segment and the second slot segment defines a pathway between the first slot segment and the second slot segment and through which an electrical trace is routed across the substrate through the pathway.

2. The printhead die of claim 1, wherein the first slot segment and the second slot segment have adjacent ends along a same minor axis.

3. The printhead die of claim 1, wherein the first slot segment is in a first column and the second slot segment is in a second column parallel to the first column.

4. The printhead die of claim 1, wherein the slot further includes a third slot segment, consecutive slot segments along the major axis alternating between a first column and a second column.

5. The printhead die of claim 4, wherein each slot segment in a given column is aligned with all other slot segments in the given column.

6. A printhead die, comprising:
   a substrate;
   a first full-length slot segmented into a plurality of discrete slot segments to deliver a first liquid through the substrate, the first full-length slot having pathways defined between adjacent slot segments of the first full-length slot;
   a second full-length slot segmented into a plurality of discrete slot segments to deliver a different second liquid through the substrate, the second full-length slot having pathways defined between adjacent slot segments of the second full-length slot; and
   an electrical trace routed across the substrate via the pathways.

7. The printhead die of claim 6, wherein the slot segments are arranged in rows, each row including a slot segment of the first full-length slot and a slot segment of the second full-length slot.

8. The printhead die of claim 7, wherein the pathways between adjacent slot segments of the first full-length slot and second full length slot define a serpentine path between adjacent rows of the slot segments.

9. The printhead die of claim 6, wherein the slot segments of each full-length slot are arranged in plural columns with adjacent slot segments in different columns.

10. The printhead die of claim 9, wherein pathways defined between adjacent slot segments of each full-length slot are diagonal pathways.

11. The printhead die of claim 6, which further comprises a plurality of nozzle packages, each nozzle package associated with a slot segment.

12. The printhead die of claim 11, wherein the electrical trace routed via the between adjacent slot segments of the first full-length slot is in electrical communication with a nozzle package associated with a slot segment of the second full-length slot.

13. A method of making a printhead die, comprising:
   defining slot locations on a substrate, staggered in two alternating columns, for a plurality of slot segments for delivering a same liquid through the substrate;
   providing, adjacent each slot location, electronics to control an array of nozzles associated with the slot location;
   providing an electrical trace from between two adjacent slot locations in one column, around one end of a third slot location in another column, to electronics on a far side of the third slot location;
   forming slots through the substrate at the slot locations; and
   forming nozzle arrays on the die adjacent each slot and each electronics.

* * * * *

UNITED STATES PATENT AND TRADEMARK OFFICE
CERTIFICATE OF CORRECTION

PATENT NO.        : 8,960,860 B2                                Page 1 of 1
APPLICATION NO.   : 14/113225
DATED             : February 24, 2015
INVENTOR(S)       : James P. Axtell et al.

It is certified that error appears in the above-identified patent and that said Letters Patent is hereby corrected as shown below:

On the title page, item (75), Inventors, in column 1, line 2, delete "Phlomath" and insert
    -- Philomath --, therefor.

Signed and Sealed this
Thirtieth Day of June, 2015

Michelle K. Lee
*Director of the United States Patent and Trademark Office*